United States Patent
Alriksson et al.

(10) Patent No.: US 10,554,252 B2
(45) Date of Patent: Feb. 4, 2020

(54) WAKEUP SYNCHRONIZATION FOR FREQUENCY HOPPING SYSTEMS

(71) Applicant: Telefonaktiebolaget LM Ericsson (publ), Stockholm (SE)

(72) Inventors: Peter Alriksson, Hörby (SE); Oskar Drugge, Hjärup (SE); David Sugirtharaj, Lund (SE); Emma Wittenmark, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/348,240

(22) PCT Filed: Dec. 16, 2016

(86) PCT No.: PCT/EP2016/081569
§ 371 (c)(1),
(2) Date: May 8, 2019

(87) PCT Pub. No.: WO2018/108295
PCT Pub. Date: Jun. 21, 2018

(65) Prior Publication Data
US 2019/0319666 A1    Oct. 17, 2019

(51) Int. Cl.
*H04B 1/7156* (2011.01)
*H04B 1/7136* (2011.01)
(Continued)

(52) U.S. Cl.
CPC ......... *H04B 1/7156* (2013.01); *H04B 1/7136* (2013.01); *H04W 52/0229* (2013.01); *H04W 56/001* (2013.01); *H04B 2001/71365* (2013.01)

(58) Field of Classification Search
CPC ............... H04B 1/7156; H04B 1/7136; H04B 2001/71365; H04W 56/001; H04W 52/0229
See application file for complete search history.

(56) References Cited

U.S. PATENT DOCUMENTS

| 5,428,820 A | 6/1995 | Okada et al. |
| 6,718,395 B1 | 4/2004 | Ziegler |

(Continued)

FOREIGN PATENT DOCUMENTS

WO    2015177774 A1    11/2015

OTHER PUBLICATIONS

ETSI, "Electromagnetic Compatibility and Radio Spectrum Matters (ERM); Wideband Transmission Systems; Data Transmission Equipment Operating in the 2,4 GHz ISM Band and Using Wide Band Modulation Techniques; Harmonised EN Covering the Essential Requirements of Article 3.2 of the R&TTE Directive", Harmonized European Standard, ETSI EN 300 328 V1.9.0, Dec. 1, 2014, pp. 1-91, ETSI.

(Continued)

*Primary Examiner* — Siu M Lee
(74) *Attorney, Agent, or Firm* — Coats & Bennett, PLLC

(57) ABSTRACT

A frequency hopping wireless communication device (30) selects the most efficient synchronization procedure given the circumstances of the wireless communication device (30) upon wake-up from a sleep mode. Generally, the wireless communication device (30) assesses the timing deviation of the wireless communication device (30) within the frequency hopping pattern upon waking up from a sleep mode, selects a synchronization procedure responsive to the timing deviation, and implements synchronization using the selected synchronization procedure.

23 Claims, 7 Drawing Sheets

(51) Int. Cl.
*H04W 52/02* (2009.01)
*H04W 56/00* (2009.01)

(56) References Cited

U.S. PATENT DOCUMENTS

| | | | |
|---|---|---|---|
| 2004/0013167 A1 | 1/2004 | Jones | |
| 2009/0147830 A1* | 6/2009 | Kaiser | H04B 1/7156 |
| | | | 375/137 |
| 2011/0176464 A1* | 7/2011 | Warner | H04B 1/713 |
| | | | 370/311 |
| 2014/0301263 A1 | 10/2014 | Ji et al. | |
| 2015/0201389 A1 | 7/2015 | Linsky et al. | |
| 2017/0034799 A1* | 2/2017 | Kim | H04W 56/00 |

OTHER PUBLICATIONS

3rd Generation Partnership Project, "3rd Generation Partnership Project; Technical Specification Group Radio Access Network; Study on Provision of Low-Cost Machine-Type Communications (MTC) User Equipments (UEs) Base on LTE (Release 12)", Technical Report, 3GPP TR 36.888 V12.0.0, Jun. 1, 2013, pp. 1-55, 3GPP.

ETSI, "Wideband Transmission Systems; Data Transmission Equipment Operating in the 2,4 GHz ISM Band and Using Wide Band Modulation Techniques; Harmonised Standard Covering the Essential Requirements of Article 3.2 of Directive 2014/53/EU", Harmonized European Standard, ETSI EN 300 328 V2.1.1, Nov. 1, 2016, pp. 1-101, ETSI.

* cited by examiner

WAKEUP SYNCHRONIZATION FOR FREQUENCY HOPPING SYSTEMS

TECHNICAL FIELD

The solution presented herein generally relates to the synchronization of wireless communication devices with the network, and more particularly to wakeup synchronization of the wireless communication device in frequency hopping systems.

BACKGROUND

Internet of Things (IoT) is quickly evolving within the telecommunications realm. Current $3^{rd}$ Generation Partnership Project (3GPP)-based standards offer three different variants supporting IoT services: enhanced Machine-Type Communications (eMTC), Narrow Band IoT (NB-IoT), and Extended Coverage-Global System for Mobile Communication (EC-GSM). eMTC and NB-IoT have been designed using LTE as a baseline, with the main difference between the two being the minimum occupied bandwidth, where eMTC and NB-IoT use 1.4 MHz and 180 kHz minimum bandwidth respectively. Both NB-IoT and eMTC have been designed with an operator deployment of macro cells in mind. Certain use cases where outdoor macro evolved NodeBs (eNBs) would communicate with IoT devices deep inside buildings are targeted, which require standardized coverage enhancement mechanisms.

3GPP Long Term Evolution (LTE) Rel-12 defined a User Equipment (UE) power saving mode allowing long battery lifetime and a new UE category allowing reduced modem complexity. 3GPP Rel-13, further introduced the eMTC feature, with a new category (Cat-M) that further reduced UE cost while supporting coverage enhancement. The key element to enable cost reduction for a Cat-M UE is to introduce a reduced UE bandwidth of 1.4 MHz in the downlink and the uplink within any system bandwidth. See 3GPP TR 36.888, "Study on Provision of Low-Cost Machine-Type Communications (MTC) User Equipments based on LTE," which is referred to herein as "TR 36.888."

In LTE the system bandwidth can be up to 20 MHz, where this total bandwidth is divided into Physical Resource Blocks (PRBs) having a predetermined bandwidth, e.g., 180 kHz. Cat-M UEs with a reduced UE bandwidth of 1.4 MHz only receive a part of the total system bandwidth at a time, e.g., a part corresponding to up to 6 PRBs, where a group of 6 PRBs may be referred to as a "PRB group."

In order to achieve the coverage targeted in LTE Rel-13 for low-complexity UEs and other UEs operating delay tolerant MTC applications, as disclosed in TR 36.888, time repetition techniques are used to allow energy accumulation of the received signals at the UE. For physical data channels, e.g., a Physical Downlink Shared CHannel (PDSCH), Physical Uplink Shared CHannel (PUSCH), etc., subframe bundling (a.k.a. Transmission Time Interval (TTI) bundling) may be used. When subframe bundling is applied, each Hybrid Automatic Repeat reQuest (HARQ) (re)transmission comprises a bundle of multiple subframes instead of just a single subframe. Repetition over multiple subframes is also applied to physical control channels.

Energy accumulation of the received signals involves several aspects. One of the main aspects involves accumulating energy for reference signals, e.g., by applying time-filters, in order to increase the quality of channel estimates used in the demodulation process. Another important aspect involves accumulating demodulated soft-bits across repeated transmissions.

European Telecommunications Standards Institute (ETSI) EN 300 328 provisions several adaptivity requirements for different operation modes. From the top level, equipment can be classified either as frequency hopping or non-frequency hopping, as well as adaptive or non-adaptive. Adaptive equipment is mandated to sense whether the channel is occupied in order to better coexist with other users of the channel. The improved coexistence may come from, e.g., Listen Before Talk (LBT) or Detect And Avoid (DAA) mechanisms. Non-frequency hopping equipment are subject to requirements on maximum Power Spectral Density (PSD) of 10 dBm/MHz, which limits the maximum output power for systems using narrower bandwidths. One commonality for any of the adaptive schemes is the consequence that the receiving node will be unaware of the result of the sensing, and thus needs to detect whether a signal is present. While such signal detection most likely would be feasible for devices operating in moderate to high Signal-to-Interference-plus-Noise Ratio (SINR) levels, such signal detection may be infeasible for very low SINR levels.

For systems using repetition schemes to achieve coverage extension, the received SINR of each individual transmission is very low. Through accumulation of multiple transmissions, the effective SINR increases. However, in cases where the accumulation includes both signal as well as noise, as could be the case when the transmitter uses adaptive mechanisms, the repetition techniques may fail. One way of avoiding this failure would be to attempt detection of each individual repetition, although as already mentioned this may not be feasible at the very low SINR levels targeted with these IoT standards.

An IoT standard for 2.4 GHz in Europe may therefore be best devised by categorizing its devices as non-adaptive frequency hopping. Requirements for non-adaptive frequency hopping include the following key parts, which are also shown in FIG. 1:

A maximum on-time of 5 ms ("ON"), which is required to be followed by a transmission gap.

A minimum duration of the transmission gap of 5 ms ("OFF").

A maximum accumulated transmit time of 15 ms on one frequency (e.g., the three ON periods on Frequency 1 in FIG. 1), which is the maximum total transmission time a node may be allowed to use before moving or hopping to the next frequency (e.g., Frequency 2 in FIG. 1).

Wireless communication devices configured to operate according to a frequency hopping pattern have unique synchronization challenges due to the ever changing transmission frequency. For example, some synchronization solutions are costly, both in terms of delay and power consumption, while other synchronization solutions do not provide sufficient accuracy or reliability. Synchronization for frequency hopping devices is an important issue, particularly given the repeated need for synchronization, e.g., after the device wakes up from a sleep mode. U.S. Patent Publication No. 2014/0301263, discloses selection of various alternative wake up procedures to address the timing resolution for UEs that operate using a discontinuous reception (DRX) mode that includes various sleep cycles. A UE selects a wake up procedure based on the length of the sleep cycle. The UE may use details of the sleep cycle, including a time offset or timing uncertainty associated with the sleep cycle, when selecting the wake-up procedure.

There is a need for a solution that handles synchronization for devices configured to operate according to a frequency hopping pattern.

SUMMARY

The solution presented herein enables a frequency hopping wireless communication device to select the most efficient synchronization procedure possible given the circumstances of the wireless communication device upon wake-up from a sleep mode. As used herein, a wireless communication device refers to any device that receives downlink communications from a network node and transmits uplink communications to the network node, where the network node and wireless communication device are both part of a wireless network. Generally, the solution presented herein assesses a timing uncertainty, which may also be referred to herein as a timing deviation, when the wireless communication device wakes up, selects a synchronization procedure responsive to the timing uncertainty, and implements synchronization using the selected synchronization procedure.

One exemplary embodiment comprises a method of synchronizing a timing of a wireless communication device with a network node. The wireless communication device is configured to operate according to a frequency hopping pattern defined by the network node, where the frequency hopping pattern comprises a dwell time representing a time interval between frequency hops. The wireless communication device is configured to receive downlink signals from the network node and to transmit uplink signals to the network node. The method, performed by the wireless communication device, comprises determining a maximum timing deviation responsive to a sleep time after the wireless communication device wakes up from a sleep mode. The sleep time represents a duration of the sleep mode. The method further comprises computing an estimated time overlap from a difference between the dwell time and the maximum timing deviation. The method further comprises selecting one of a first synchronization procedure and a second synchronization procedure. The first synchronization procedure assumes a known timing position of the wireless communication device within the frequency hopping pattern, and the second synchronization procedure assumes an unknown timing position of the wireless communication device within the frequency hopping pattern. The wireless communication device selects the first synchronization procedure when the estimated time overlap exceeds a threshold. The wireless communication device selects the second synchronization procedure when the estimated time overlap is less than or equal to the threshold. The method further comprises synchronizing the timing of the wireless communication device using the selected synchronization procedure.

Another exemplary embodiment comprises a wireless communication device with a network node configured to receive downlink signals from the network node and to transmit uplink signals to the network node. The wireless communication device is configured to operate according to a frequency hopping pattern defined by the network node, where the frequency hopping pattern comprises a dwell time representing a time interval between frequency hops. The wireless communication device comprises a timing circuit, a selection circuit, and a synchronization circuit. The timing circuit is configured to determine a maximum timing deviation responsive to a sleep time after the wireless communication device wakes up from a sleep mode. The sleep time represents a duration of the sleep mode. The timing circuit is further configured to compute an estimated time overlap from a difference between the dwell time and the maximum timing deviation. The selection circuit is configured to select one of a first synchronization procedure and a second synchronization procedure. The first synchronization procedure assumes a known timing position of the wireless communication device within the frequency hopping pattern, and the second synchronization procedure assumes an unknown timing position of the wireless communication device within the frequency hopping pattern. The selection circuit is configured to select the first synchronization procedure when the estimated time overlap exceeds a threshold, and select the second synchronization procedure when the estimated time overlap is less than or equal to the threshold. The synchronization circuit is configured to synchronize the timing of the wireless communication device using the selected synchronization procedure.

Another exemplary embodiment comprises a wireless communication device with a network node configured to receive downlink signals from the network node and to transmit uplink signals to the network node. The wireless communication device is configured to operate according to a frequency hopping pattern defined by the network node, where the frequency hopping pattern comprises a dwell time representing a time interval between frequency hops. The wireless communication device comprises a timing module, a selection module, and a synchronization module. The timing module is configured to determine a maximum timing deviation responsive to a sleep time after the wireless communication device wakes up from a sleep mode. The sleep time represents a duration of the sleep mode. The timing module is further configured to compute an estimated time overlap from a difference between the dwell time and the maximum timing deviation. The selection module is configured to select one of a first synchronization procedure and a second synchronization procedure. The first synchronization procedure assumes a known timing position of the wireless communication device within the frequency hopping pattern, and the second synchronization procedure assumes an unknown timing position of the wireless communication device within the frequency hopping pattern. The selection module is configured to select the first synchronization procedure when the estimated time overlap exceeds a threshold, and select the second synchronization procedure when the estimated time overlap is less than or equal to the threshold. The synchronization module is configured to synchronize the timing of the wireless communication device using the selected synchronization procedure.

Another exemplary embodiment comprises a non-transitory computer readable medium storing a computer program product for controlling a wireless communication device to synchronize a timing of the wireless communication device with a network node. The wireless communication device is configured to operate according to a frequency hopping pattern defined by the network node, where the frequency hopping pattern comprises a dwell time representing a time interval between frequency hops. The wireless communication device is configured to receive downlink signals from the network node and to transmit uplink signals to the network node. The computer program product comprises software instructions which, when run on a processing circuit in the wireless communication device, causes the processing circuit to determine a maximum timing deviation responsive to a sleep time after the wireless communication device wakes up from a sleep mode. The sleep time representing a duration of the sleep mode. The software instructions, when run on the processing circuit, further cause the processing circuit to compute an estimated time overlap from a difference between the dwell time and the maximum timing deviation. The software instructions, when run on the processing circuit, further cause the processing circuit to select a first synchronization procedure or a second synchronization procedure. The first synchronization procedure assumes a known timing position of the wireless communication device within the frequency hopping pattern, and the second synchronization procedure assumes an unknown timing position of the wireless communication device within the frequency hopping pattern. The software instructions, when run on the processing circuit, cause the processing circuit to select the first synchronization procedure when the estimated time overlap exceeds a threshold, and to select the second synchronization procedure when the estimated time overlap is less than or equal to the threshold. The software instructions, when run on the processing circuit, further cause the processing circuit to synchronize the timing of the wireless communication device using the selected synchronization procedure.

Another exemplary embodiment comprises a computer program comprising instructions which, when executed on at least one processor in a wireless communication device, causes the wireless communication device to execute the method of synchronizing a timing of a wireless communication device with a network node disclosed and claimed herein. Another embodiment comprises a computer-readable medium comprising the computer program. In some embodiments, the computer-readable medium comprises a non-transitory computer-readable medium.

DETAILED DESCRIPTION

Figure 1:
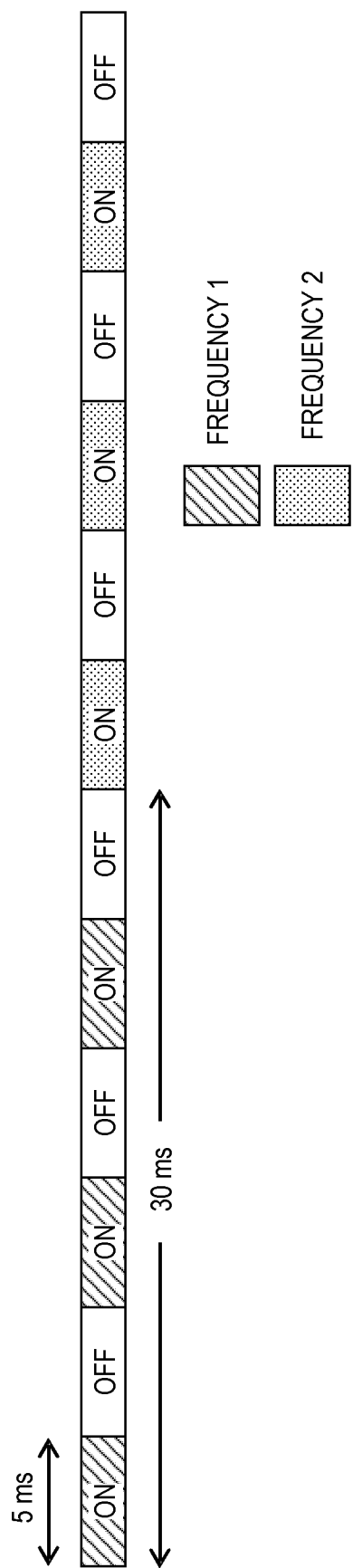
FIG. 1 shows an example of a frequency hopping pattern.
Figure 2:
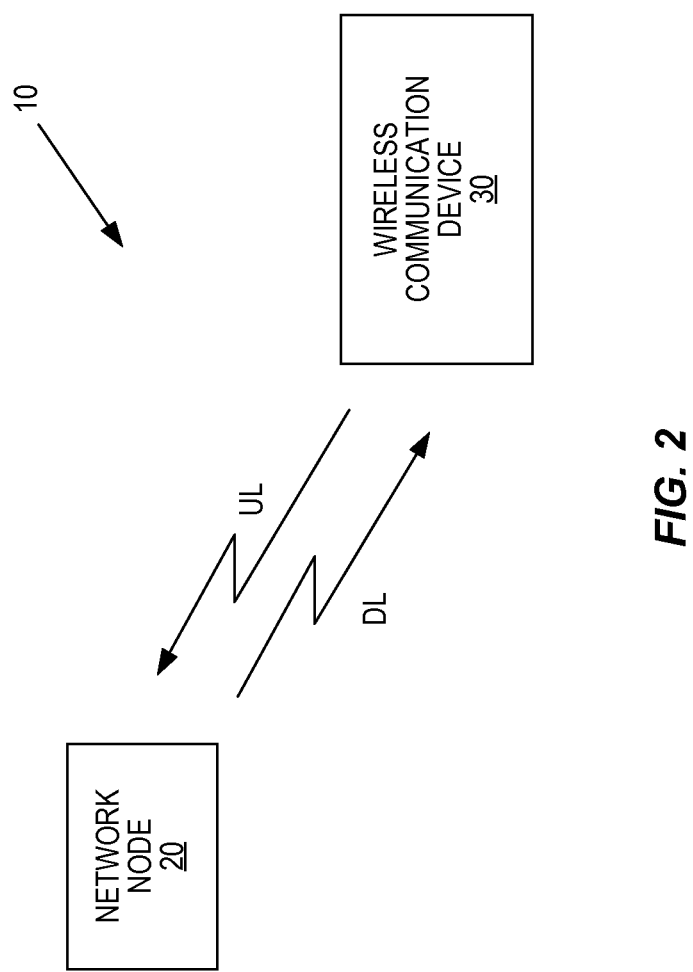
FIG. 2 shows block diagram of an exemplary wireless network.

FIG. 2 shows one exemplary wireless network 10 comprising a network node 20 and a wireless communication device 30, where the wireless communication device 30 sends uplink signals to the network node 20 and receives downlink signals from the network node 20. In the context of the solution presented herein, it should be understood that a network node 20 may comprise a radio network node (e.g., a radio base station, NB, eNB, etc.). Exemplary wireless communication devices 30 comprise, but are not limited to, a machine-to-machine (M2M) device, a machine-type communications (MTC) device, and/or a NB-IoT device. The wireless communication device 30 may also comprise a User Equipment (UE), however it should be noted that the UE does not necessarily have a "user" in the sense of an individual person owning and/or operating the device. A wireless communication device 30 may also be referred to as a radio device, a radio communication device, a wireless terminal, or simply a terminal. Unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms M2M device, MTC device, wireless sensor, and sensor may also be used. It should be understood that these devices may be UEs, but are generally configured to transmit and/or receive data without direct human interaction. In an IoT scenario, a wireless communication device 30 as described herein may be, or may be comprised in, a machine or device that performs monitoring or measurements, and transmits the results of such monitoring measurements to another device or a network. Particular examples of such machines are power meters, industrial machinery, or home or personal appliances, e.g., refrigerators, televisions, personal wearables such as watches etc. In other scenarios, a wireless communication device 30 as described herein may be comprised in a vehicle and may perform monitoring and/or reporting of the vehicle's operational status or other functions associated with the vehicle.

As disclosed herein a frequency hopping wireless communication device (30) selects the most efficient synchronization procedure given the circumstances of the wireless communication device (30) upon wake-up from a sleep mode. Generally, the wireless communication device (30) assesses the timing deviation of the wireless communication device (30) within the frequency hopping pattern upon waking up from a sleep mode, selects a synchronization procedure responsive to the timing deviation, and implements synchronization using the selected synchronization procedure.

Figure 3:
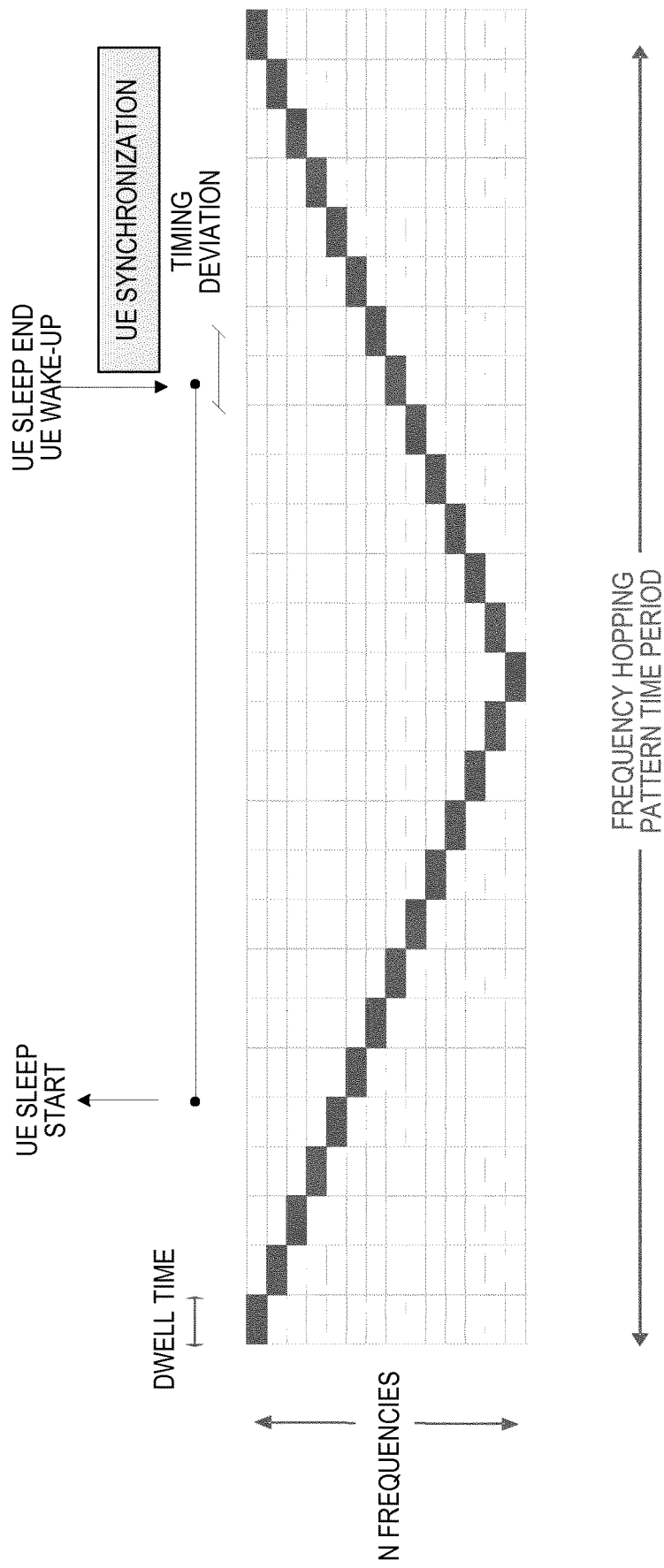
FIG. 3 shows an example of a wireless communication device entering and exiting a sleep mode.

When the wireless communication device 30 is configured to operate according to a frequency hopping pattern defined by the network node 20, e.g., as shown in FIG. 3, where the dwell time represents the amount of time the frequency hopping pattern stays on a particular frequency. It will be appreciated that in some embodiments, network node 20 may provide identification information to the wireless communication device 30 that identifies the frequency hopping pattern to the wireless communication device 30. While wireless communication device 30 is awake and synchronized to the timing of the network node 20, the wireless communication device 30 changes frequency according to the frequency hopping pattern. However, when wireless communication device 30 goes to sleep or otherwise becomes idle, the wireless communication device 30 loses synchronization with the network node 20, and thus must resynchronize upon waking up. FIG. 3 shows an example of the timing uncertainty, also referred to herein as timing deviation, that may result after the device 30 wakes up. As shown in FIG. 3, the frequency hopping pattern continues to hop from one frequency to the next, where the dwell time represents the amount of time between frequency hops, while the wireless communication device 30 is asleep. It will be appreciated that the pattern of FIG. 3 represents one hopping pattern that is presented for illustration purposes only, and does not limit the solution presented herein.

The wireless communication device 30 goes to sleep to conserve battery power, and then wakes up to resume operations as needed. Upon waking up, wireless communication device 30 synchronizes its timing with that of the network node 20. In a frequency hopping system, when the wireless communication device 30 wakes up, the wireless communication device 30 has the challenge of determining where the network timing is with respect to the frequency hopping pattern. As shown in FIG. 3, when the wireless communication device 30 wakes up, there is some range of timing deviation before the wireless communication device 30 becomes synchronized with the network node 20. The extent of that deviation depends upon how long the wireless communication device 30 was asleep and the deviation between a network node clock and the clock within the wireless communication device 30.

One way for wireless communication device 30 to achieve synchronization is to use a synchronization procedure that assumes the timing position of the wireless communication device 30 within the frequency hopping pattern is unknown. As used herein, the "timing position" refers to what position in time, and thus what frequency, the wireless communication device 30 is operating on within the frequency hopping pattern. This synchronization procedure is used, e.g., when the wireless communication device 30 has been asleep for so long, it no longer has any timing reference to the system it wants to access. In this case, wireless communication device 30 selects a frequency (i.e., one of the frequencies in the frequency hopping pattern) to receive on, where the wireless communication device 30 uses that frequency until synchronization is achieved. In other words, the wireless communication device 30 waits on a single frequency known to be part of the frequency hopping pattern until synchronization is achieved. To that end, wireless communication device 30 may perform some type of time-correlation to look for a known or set of known sequences. In LTE, for example, this type of synchronization procedure is often referred to as an initial cell search, which may be necessary when the wireless communication device 30 is turned on and/or has been sleeping for such a long time that that it has no timing reference to the network node 20 or to the system it wants to access. Because the wireless communication device 30 does not know on which frequency the network node 20 is operating, and thus must proceed assuming an unknown timing position, this synchronization procedure is costly in both terms of delay and power consumption. Thus, it is desirable to limit the use of this synchronization procedure whenever possible.

Another way for the wireless communication device 30 to achieve synchronization is to use a synchronization procedure that assumes a known timing position of the wireless communication device 30 within the frequency hopping pattern. The wireless communication device 30 therefore assumes it has some knowledge of the timing reference, even if that timing reference is not good enough to use for accurate reception. In this case, wireless communication device 30 evaluates the accuracy of the timing reference relative to a target time, e.g., a paging occasion or a random access opportunity. In other words, wireless communication device 30 assumes it knows enough about the current timing to achieve synchronization before a target time expires. Accordingly, the wireless communication device 30 follows the frequency hopping pattern (using the assumed timing) while attempting to synchronize its timing with the network node 20. The amount of time a frequency hopping wireless communication device 30 can spend for accumulation and multiple synchronization attempts on one frequency is limited by the dwell time of the frequency hopping pattern and the accuracy of the device's timing reference upon waking up from the sleep mode. Thus, while this second synchronization procedure may be shorter and may consume less power, dwell time limitations may hamper the device's ability to actually achieve synchronization while following the frequency hopping pattern.

Figure 4:
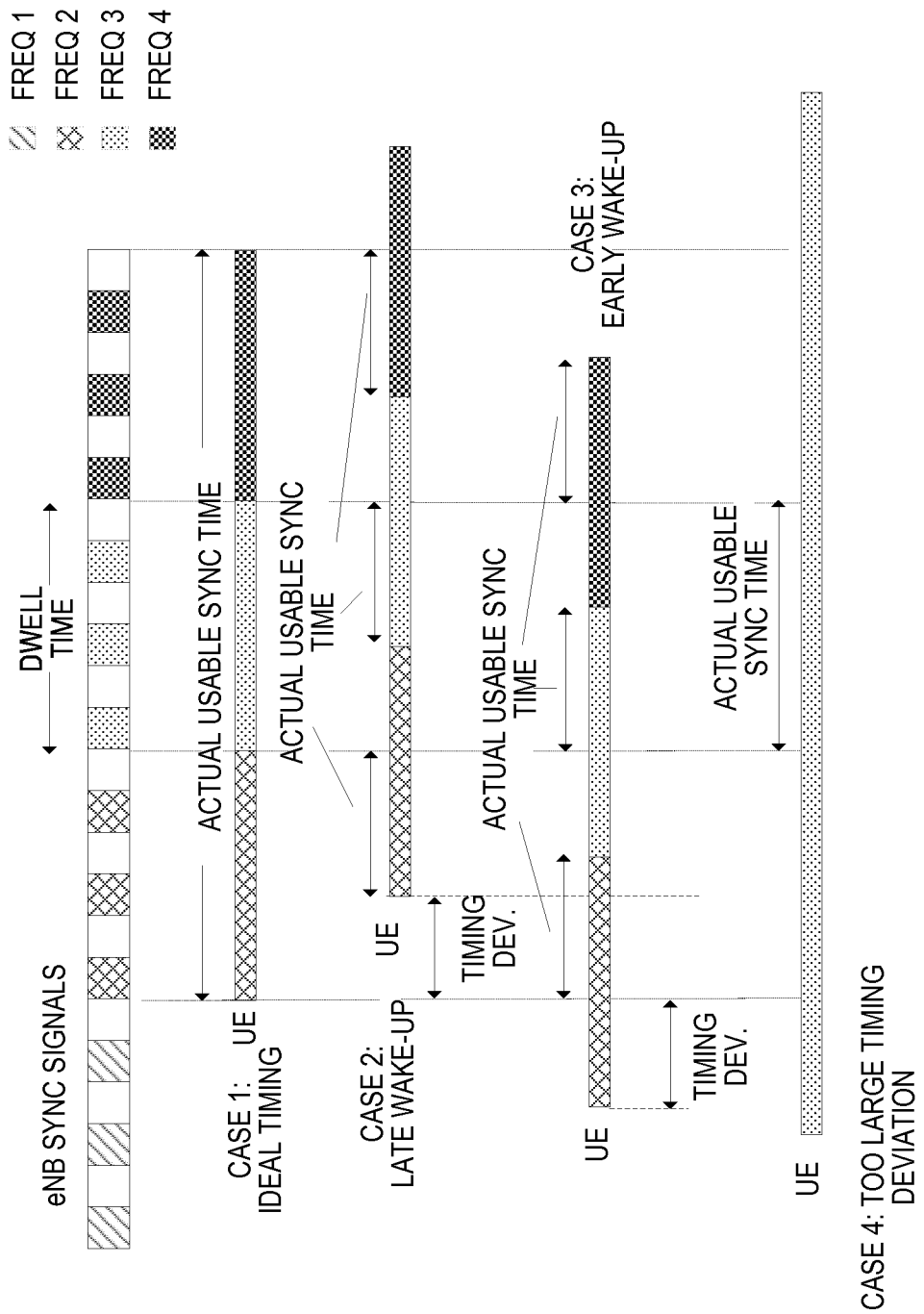
FIG. 4 shows examples of timing deviation of a wireless communication device upon waking up from a sleep mode.

FIG. 4 demonstrates the problems associated with when the wireless communication device 30 wakes up relative to the timing of the frequency hopping pattern. The top of FIG. 4 shows an exemplary 4-frequency hopping pattern relative to time, as well as the corresponding dwell time. In Case 1, wireless communication device 30 wakes up at the ideal time, e.g., aligned with the timing of the frequency hopping pattern, and thus has the entire dwell time to achieve synchronization. In Cases 2 and 3, wireless communication device 30 wakes up somewhere in the middle of a dwell time, and thus only has a portion of the dwell time remaining to achieve synchronization before the frequency hops. In particular, in Case 2 the wireless communication device 30 wakes up late, increasing the likelihood that the network node 20 changes the frequency according to the frequency hopping pattern before the wireless communication device 30 changes the frequency. Similarly, in Case 3 the wireless communication device 30 wakes up early, increasing the likelihood that the wireless communication device 30 changes the frequency according to the frequency hopping pattern before the network node 20 changes the frequency. In each of Cases 2 and 3, the timing deviation upon waking up is potentially small enough to enable the wireless communication device 30 to follow the frequency hopping pattern while attempting to achieve synchronization.

Case 4, provides a different scenario. In Case 4, the timing deviation is too large, leaving insufficient time for wireless communication device 30 to follow the frequency hopping pattern while attempting synchronization. In other words, when the timing deviation of the wireless communication device 30 upon waking up is greater than the dwell time of the frequency hopping pattern, the wireless communication device 30 does not have any reasonable expectation of knowing the timing with the network, and when the timing deviation upon waking up is within the dwell time, i.e., when the time overlap exceeds a threshold, the wireless communication device 30 may be able to assume it has reasonable knowledge about the network timing.

Figure 5:
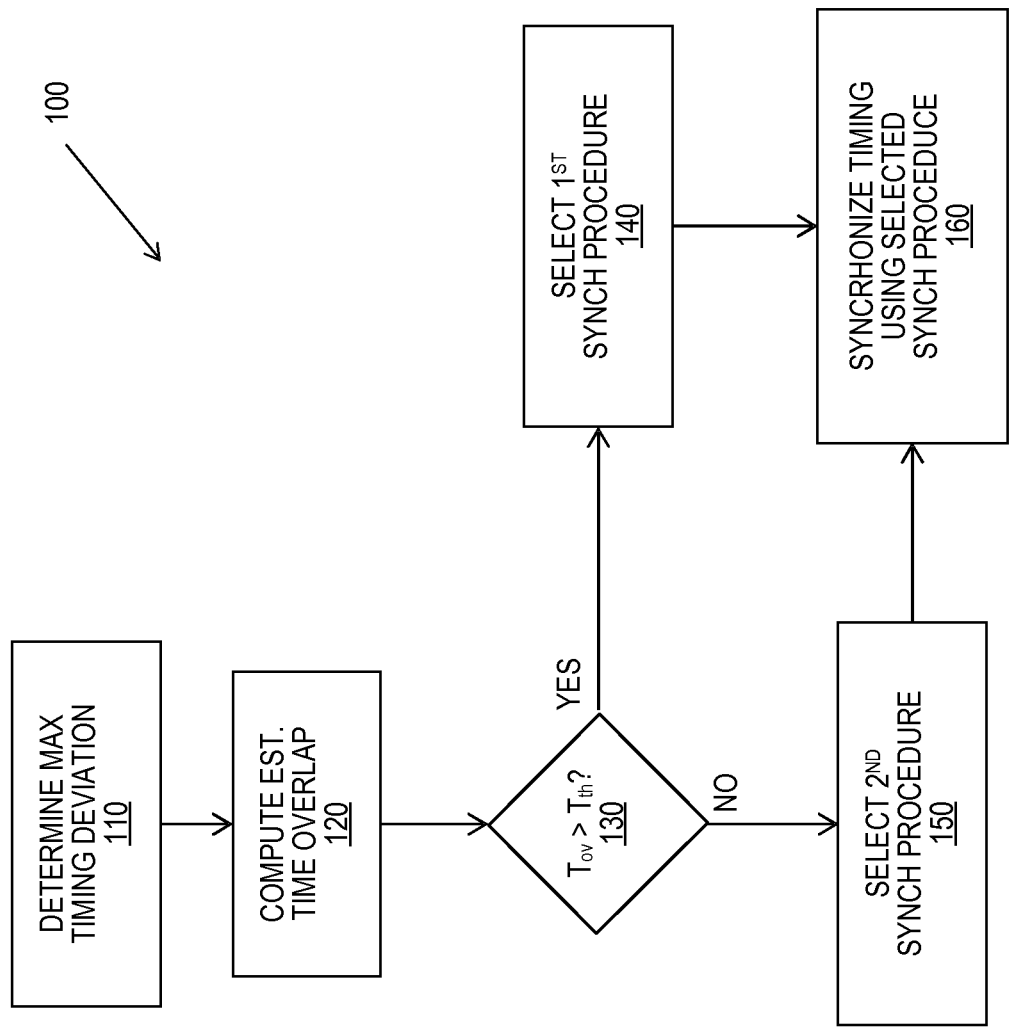
FIG. 5 shows a synchronization method according to one exemplary embodiment.

FIG. 5 shows one exemplary method 100 of the solution presented herein that addresses the above-identified synchronization problems associated with a frequency hopping device 30 relative to the amount of timing deviation. Upon waking up, the wireless communication device 30 determines a maximum timing deviation, which may also be referred to herein as timing uncertainty, responsive to a sleep time (block 110), where the sleep time represents a duration of the sleep mode. In one exemplary embodiment, the maximum timing deviation comprises a maximum deviation possible given the duration of the sleep mode. In other embodiments, the maximum timing deviation comprises a more general estimate of the amount of timing deviation expected due to the duration of the sleep mode. In any event, the wireless communication device 30 computes an estimated time overlap from a difference between a dwell time and the maximum timing deviation (block 120). The dwell time comprises a time between frequency hops of the frequency hopping pattern. As such, the estimated time overlap represents an estimate of an amount of time available for synchronization using a frequency of the frequency hopping pattern. The wireless communication device 30 compares the estimated time overlap to a threshold (block 130), e.g., a minimum time overlap threshold. The wireless communication device 30 selects the first synchronization procedure when the estimated time overlap exceeds a threshold (block 140), and selects the second synchronization procedure when the estimated time overlap is less than or equal to the threshold (block 150). The first synchronization procedure assumes a known timing position of the wireless communication device 30 within the frequency hopping pattern, i.e., assumes it is known what position in time, and thus on what frequency, within the frequency hopping pattern the wireless communication device 30 should operate. For example, the first synchronization procedure may comprise following the frequency hopping pattern with the assumed known timing position being the same as it was before the wireless communication device 30 entered the sleep mode. In another exemplary embodiment, the first synchronization procedure may comprise following the frequency hopping pattern with the assumed known timing position being an estimated timing determined responsive to the sleep time. In any event, the first synchronization procedure assumes synchronization can be achieved before the network node 20 changes frequencies (according to the frequency hopping pattern) and/or can be achieved while the wireless communication device 30 follows the frequency hopping pattern. The second synchronization procedure assumes an unknown timing position of the wireless communication device 30 within the frequency hopping pattern, i.e., assumes it is unknown what position in time, and thus on what frequency, within the frequency hopping pattern the wireless communication device 30 should operate. For example, the second synchronization procedure may comprise the selection of one frequency known to be part of the frequency hopping pattern, e.g., one of the frequency hopping pattern frequencies where a synchronization signal is transmitted, where the wireless communication device 30 stays on the selected frequency (and thus does not hop) until synchronization is achieved. The wireless communication device 30 then synchronizes the timing of the wireless communication device 30 using the selected synchronization procedure (block 160). In so doing, wireless communication device 30 selects the more efficient synchronization procedure (in terms of time and power) when that procedure is expected to achieve synchronization while wireless communication device 30 follows the frequency hopping pattern, and otherwise reverts back to the other procedure which, while more costly in terms of time and power, will eventually achieve the necessary synchronization. As a result, the solution presented herein enables the wireless communication device 30 to intelligently select a synchronization procedure, and thus to conserve resources (e.g., time and power) as much as possible.

The wireless communication device 30 may determine the maximum timing deviation using any number of techniques that employ the sleep time. For example, the wireless communication device 30 may determine the maximum timing deviation by multiplying the sleep time by a clock drift rate associated with a clock circuit in the wireless communication device 30, e.g., a clock circuit 262 associated with or comprised within the transceiver circuit/module 260. In another embodiment, the wireless communication device 30 may use a look-up table stored in a memory of the device 30 to determine the maximum timing deviation, where the look-up table stores a plurality of timing deviations, each corresponding to a particular sleep time. In this embodiment, wireless communication device 30 retrieves the timing deviation in the look-up table corresponding to the sleep time closest to the current sleep time (the duration of the most recent sleep mode), and sets the maximum timing deviation to the retrieved timing duration. In another embodiment, wireless communication device 30 may use a known or previously calculated timing deviation to determine the maximum timing deviation for the current sleep time. For example, wireless communication device 30 may calculate or use a past timing deviation associated with a past sleep mode (and corresponding sleep time) to determine the maximum timing deviation for the current sleep time, e.g., by extrapolating or otherwise interpolating the past timing deviation relative to the current and past sleep times.

In some embodiments, wireless communication device 30 may consider variables in addition to the sleep time when determining the maximum timing deviation. For example, the temperature within the wireless communication device 30 upon entry into the sleep mode may differ from the temperature upon completion of the sleep mode. Because such a temperature differential may impact the accuracy of the timing deviation, wireless communication device 30 may consider this temperature differential along with the sleep time when determining the maximum timing differential. In another embodiment, wireless communication device 30 may alternatively or additionally consider the age of a frequency generation device, e.g., oscillator 264, in the wireless communication device 30 when determining the maximum timing deviation. For example, the wireless communication device 30 may map the temperature differential to a maximum clock drift rate, and then compute the maximum timing deviation based on the maximum clock drift rate and the sleep time. When the age of the frequency generation device 264 is taken into consideration, the mapping may consider the age and the temperature differential.

In any event, once wireless communication device 30 estimates the maximum timing deviation, the wireless communication device 30 uses that information to estimate what portion of the dwell time remains before the frequency hops, i.e., the estimated time overlap, by computing a difference between the dwell time and the maximum timing deviation. To that end, the wireless communication device 30 may retrieve the dwell time from memory. In some embodiments, however, the wireless communication device 30 may also determine the dwell time, e.g., by measuring the dwell time of the known frequency hopping pattern or by receiving the dwell receiving information regarding the dwell time from the network node 20. If the estimated time overlap is not sufficiently large, e.g., is less than or equal to a threshold, wireless communication device 30 attempts synchronization assuming an unknown timing position of the wireless communication device 30 within the frequency hopping pattern. If the estimated time overlap is sufficiently large, e.g., exceeds the threshold, wireless communication device 30 attempts synchronization assuming a known timing position of the wireless communication device 30 within the frequency hopping pattern. For example, the known timing position assumed by wireless communication device 30 may comprise the same timing position used by the wireless communication device 30 before it entered the sleep mode. In other words, wireless communication device 30 may attempt synchronization using whatever timing position was being used when the wireless communication device 30 entered the sleep mode. In another example, upon waking up, the wireless communication device 30 may use the sleep time to estimate a timing, and use the estimated timing when attempting synchronization. In this exemplary embodiment, wireless communication device 30 is using its knowledge of the sleep time to estimate what the timing would have been if the wireless communication device 30 had not gone to sleep, and using that estimated timing for synchronization.

The threshold used to select the synchronization procedure may comprise any threshold that helps identify whether the estimated time overlap is sufficiently large. For example, the threshold may comprise a minimum time overlap, which in some embodiments represents the minimum usable synchronization time. In exemplary embodiments, the threshold depends on the particular synchronization algorithm used by the wireless communication device 30, but can for example be the minimum time required to guarantee that a complete synchronization signal transmission (the synchronization transmission can comprise of different parts, e.g. a PSS and SSS part) can be received. One way to compute this time is by adding the periodicity of the synchronization signal to the length of the synchronization signal. The threshold can also, e.g., depend on the position, energy, and/or length of each synchronization burst, the distance between synchronization bursts, or the number of synchronization bursts the wireless communication device 30 requires to be able to synchronize.

It will be appreciated that the synchronization procedure used to attempt synchronization is selected based upon estimated timing values. Thus, there may be some instances where synchronization using a known timing position is attempted but is unsuccessful. To prevent wireless communication device 30 from wasting too much time on a synchronization procedure that is likely to continue to fail, the solution presented herein may also limit the amount of time the wireless communication device 30 uses the known timing position for synchronization. For example, in one embodiment, when the synchronization procedure relying on the known timing position begins, the wireless communication device 30 may start a timer. If the timer expires before synchronization is achieved, wireless communication device 30 changes the synchronization procedure to instead assume the timing position is unknown. In another exemplary embodiment, when the synchronization procedure relying on the known timing position begins, wireless communication device 30 may initialize a counter, and increment the counter after each unsuccessful synchronization attempt. If the counter reaches a predetermined limit before synchronization is achieved, the wireless communication device 30 changes the synchronization procedure to instead assume the timing position is unknown.

Figure 6:
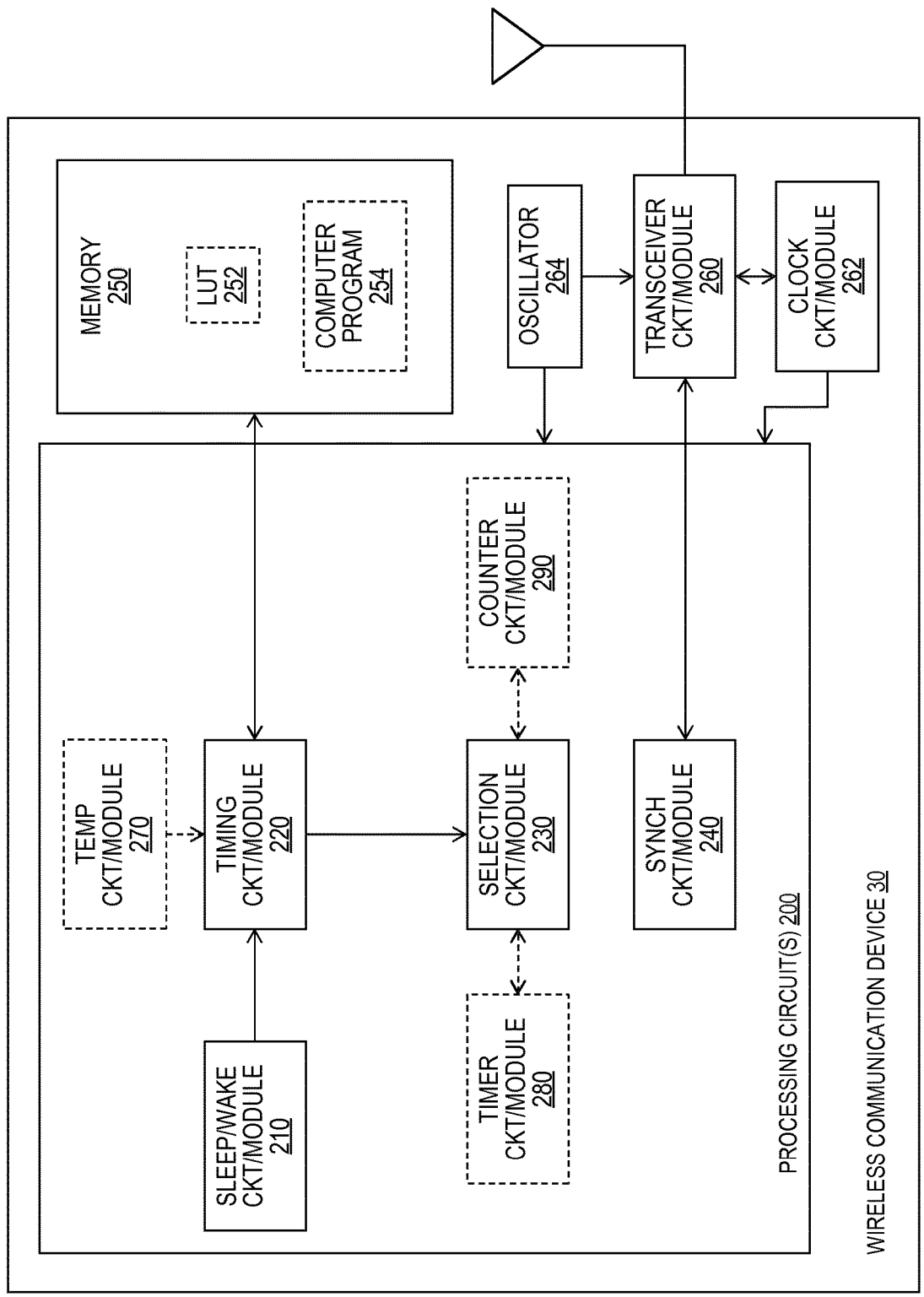
FIG. 6 shows a block diagram of a wireless communication device according to one exemplary embodiment.

FIG. 6 shows a block diagram of a wireless communication device 30 according to one exemplary embodiment. The wireless communication device 30 of FIG. 6 includes one or more processing circuits 200 for performing the steps of the corresponding method 100 in FIG. 5. The circuit(s) 200 or circuitry in this regard may comprise circuit(s) 200 dedicated to performing certain functional processing and/or one or more microprocessors in conjunction with memory 250. In embodiments that employ memory 250, which may comprise one or several types of memory such as read-only memory (ROM), random-access memory, cache memory, flash memory devices, optical storage devices, etc., the memory 250 stores a computer program/program code 254 that, when executed by the one or more processors/circuits 200, carries out the techniques described herein.

FIG. 6 shows wireless communication device 30 implemented in accordance with one or more other embodiments. As shown, the processing circuit(s) 200 in wireless communication device 30 implements various functional means, units, circuits, or modules. These functional means, units, circuits, or modules include for example a sleep/wake circuit/module 210, a timing circuit/module 220, a selection circuit/module 230, and a synchronization circuit/module 240 that collectively implement the method of FIG. 5. More particularly, the sleep/wake circuit/module 210 controls how and when the wireless communication device 30 enters and exits the sleep mode. The timing circuit/module 220 is configured to determine a sleep time, to determine a maximum timing deviation responsive to the sleep time after wireless communication device 30 wakes up from a sleep mode, and to compute an estimated time overlap from a difference between the dwell time of the frequency hopping pattern and the determined maximum timing deviation. The selection circuit/module 230 is configured to select a first synchronization procedure when the estimated time overlap exceeds a threshold, where the first synchronization procedure assumes a known timing position of the wireless communication device within the frequency hopping pattern. When the first synchronization procedure is selected, the timing circuit/module 220 may further determine an estimated timing responsive to the sleep time, where this estimated timing is used as the known timing position for synchronization. The selection circuit/module 230 is also configured to select a second synchronization procedure when the estimated time overlap is less than or equal to the threshold, where the second synchronization procedure assumes an unknown timing position of the wireless communication device within the frequency hopping pattern. The synchronization circuit/module 240 is configured to synchronize the timing of wireless communication device 30 using the selected synchronization procedure. When synchronizing using the first synchronization procedure, the synchronization circuit/module 240 follows the frequency hopping pattern with the assumed known timing position, e.g., the same timing position used by the wireless communication device 30 before it entered the sleep mode, the estimated timing estimated by the timing circuit/module 220 responsive to the sleep time, etc. When using the second synchronization procedure to achieve synchronization, the synchronization circuit/module 240 stays on one frequency (without hopping), e.g., stays on a frequency selected by the selection circuit/module 230, until the wireless communication device 30 achieves synchronization. For example, the selection circuit/module 230 may select a frequency known to be part of the frequency hopping pattern, where the selected frequency may be a frequency in the frequency hopping pattern where synchronization signal(s) are transmitted. Once synchronization is achieved, the transceiver circuit/module 260 then transmits/receives signals according to any known standard.

Wireless communication device 30 may optionally include additional circuits/modules for implementing additional embodiments of the solution presented herein. For example, wireless communication device 30 may optionally include a temperature circuit/module 270 configured to measure the temperature within the wireless communication device 30, e.g., before the wireless communication device 30 enters the sleep mode and after the wireless communication device 30 exits the sleep mode. Timing circuit/module 220 may then use the measured temperatures to further improve the estimate of the maximum timing deviation. In another exemplary embodiment, wireless communication device 30 may optionally include a timer circuit/module 280 or a counter circuit/module 290 to limit the amount of time the wireless communication device 30 attempts synchronization using the known timing position, as discussed herein. Further, memory 250 may optionally include a look-up table 252 that stores a plurality of timing deviations relative to a corresponding plurality of sleep times, where the timing circuit/module 220 determines the maximum timing deviation using the look-up table 252 as discussed herein. Further, the transceiver circuit/module 260 may be configured to receive the frequency hopping pattern from the network node, and in some embodiments, the transceiver circuit/module 260 may further be configured to receive information regarding the dwell time from the network node 20.

To further illustrate the solution presented herein, the following provides operational examples. In a first example, the dwell time is 30 ms, the clock drift rate is 10 ppm, and the sleep time is 30 minutes. In this example, the maximum timing deviation is determined by multiplying the clock drift rate by the sleep time, which results in a maximum timing deviation of 18 ms. The estimated time overlap is computed from a difference between the dwell time and the maximum timing deviation, which results in an estimated time overlap of 12 ms. When the synchronization signal is 1 ms long and repeats every 10 ms, an exemplary threshold is 11 ms. Because the estimated time overlap (12 ms) exceeds the threshold (11 ms), wireless communication device 30 implements a synchronization procedure that assumes a known timing position, and thus will attempt synchronization using a continuation of the frequency hopping pattern in use before the wireless communication device 30 entered the sleep mode.

In another example, the dwell time is 20 ms, the clock drift rate is 10 ppm, and the sleep time is 30 minutes. In this example, the maximum timing deviation is determined by multiplying the clock drift rate by the sleep time, which results in a maximum timing deviation of 18 ms. The estimated time overlap is computed from a difference between the dwell time and the maximum timing deviation, which results in an estimated time overlap of 2 ms. When the synchronization signal is 1 ms long and repeats every 10 ms, an exemplary threshold is 11 ms. Because the estimated time overlap (2 ms) is less than the threshold (11 ms), wireless communication device 30 implements a synchronization procedure that assumes an unknown timing position, and thus will attempt synchronization by waiting on one frequency known to be part of the frequency hopping pattern during the entire synchronization procedure.

Figure 7:
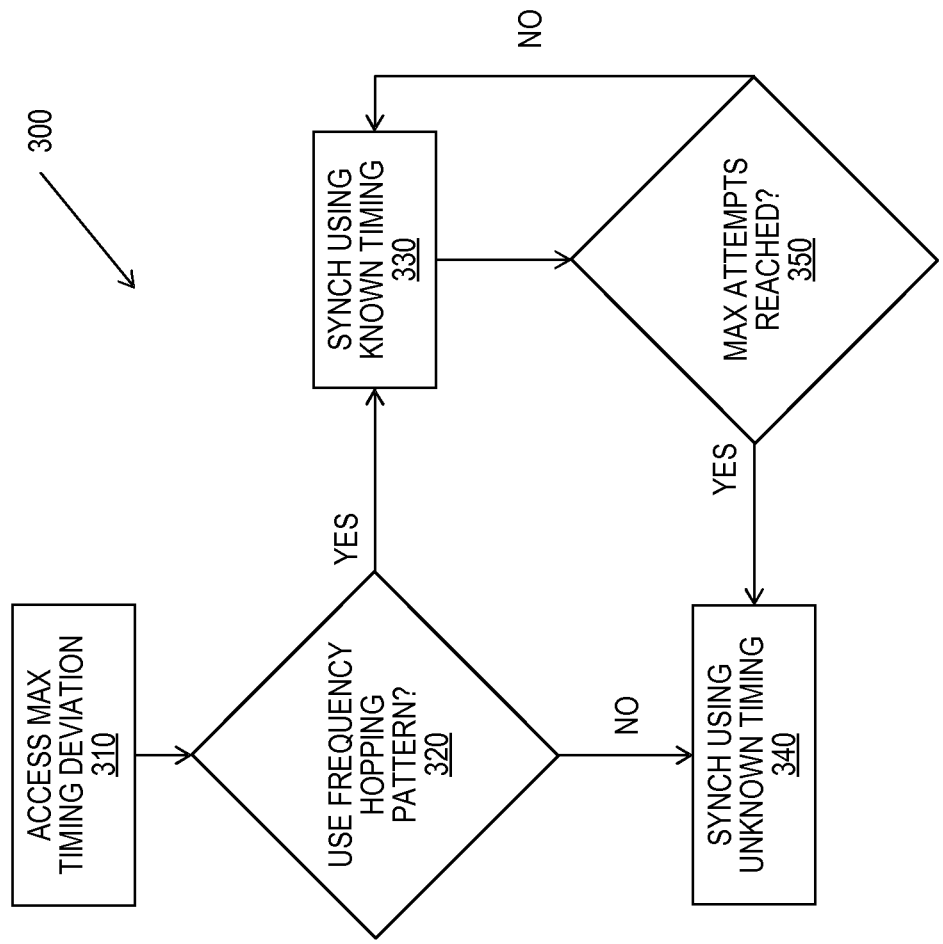
FIG. 7 shows a synchronization method according to another exemplary embodiment.

FIG. 7 shows another method 300 according to one exemplary embodiment. Method 300 comprises assessing the maximum timing deviation after waking up from sleep (block 310). Based on that assessment, method 300 comprises judging if the wireless communication device 30 will be able to receive synchronization signals if it continues to apply the frequency hopping pattern used prior to entering sleep (block 320). If not, the wireless communication device 30 resorts to a synchronization procedure where the timing position of the device 30 within the frequency hopping pattern is assumed to be unknown (block 340). In case it is determined that the known timing position can be used for synchronization (block 330), but synch has not been established after a maximum number of attempts (block 350), wireless communication device 30 reverts to using the synchronization procedure that assumes the timing position of the wireless communication device 30 within the frequency hopping pattern is unknown (block 340).

In one embodiment, assessing the maximum timing deviation (block 310) comprises multiplying the maximum clock frequency uncertainty given from, e.g., component specifications with the sleep time. For example, a clock drift rate of 10 ppm and a sleep time of 30 min gives a maximum timing deviation of $10*10^{-6}30*60*1000=18$ ms.

Given the maximum timing deviation estimated by the wireless communication device 30 (block 310) the wireless communication device 30 computes the minimum time the UE is expected to be tuned to the correct frequency, e.g., the time overlap (see FIG. 4). As a non-limiting example the time overlap can be estimated as the difference between the dwell time and the maximum timing deviation. The wireless communication device 30 compares the estimated time overlap to a threshold, e.g., the minimum time overlap, which in some embodiments represents the minimum usable synchronization time. In exemplary embodiments, the threshold depends on the particular synchronization algorithm used by the wireless communication device 30, but can for example be the minimum time required to guarantee that a complete synchronization signal transmission (the synchronization transmission can comprise of different parts, e.g. a PSS and SSS part) can be received. One way to compute this time is by adding the periodicity of the synchronization signal to the length of the synchronization signal. The threshold can also, e.g., depend on the position, energy, and length of each synchronization burst, the distance between synchronization bursts, or the number of synchronization bursts the wireless communication device 30 requires to be able to synchronize.

If the estimated time overlap is judged to be large enough (larger than the threshold), the wireless communication device 30 attempts synchronization assuming a known timing position, e.g., using the frequency hopping pattern used prior to entering a sleep mode or the continuation of the pattern at the point when it wakes up (block 330). If the estimated time overlap is judged not to be large enough (smaller than the threshold), the wireless communication device 30 attempts synchronization assuming an unknown timing position, e.g., without using the frequency hopping pattern used before entering the sleep mode, and thus stays on one frequency known to be part of the frequency hopping pattern (block 340).

When assuming a known timing position, the wireless communication device 30 may tune to the frequency corresponding to the frequency hopping pattern used prior to entering the sleep mode (e.g., the continuation of the pattern corresponding to the point in time when it wakes up) and attempts synchronization, e.g., by correlating a known sequence to the received signal. The wireless communication device 30 then follows the frequency hopping pattern until synchronization is achieved or a maximum number of attempts (or time spent) has been reached (block 350). If the maximum number of attempts, or the maximum amount of time, is reached before synchronization is achieved, the wireless communication device 30 resorts to synchronization assuming the unknown timing position (block 340).

While the wireless communication device 30 attempts synchronization assuming the known timing position (block 330), the wireless communication device 30 continually calculates the maximum timing deviation and estimated time overlap. If the estimated time overlap becomes smaller than the threshold before synchronization is achieved, the wireless communication device 30 resorts to the synchronization procedure that assumes the unknown timing position (block 340). For example, when the clock in the wireless communication device 30 continues to drift, the maximum timing deviation may increase while the device 30 is attempting synchronization. If this continued drift causes the maximum timing deviation to continue to increase such that the time overlap decreases to below the threshold before synchronization is achieved, the wireless communication device 30 may switch to the synchronization procedure that assumes an unknown timing position.

When implementing the synchronization procedure that assumes an unknown timing position, wireless communication device 30 tunes to one frequency where it expects signals used for synchronization to be transmitted, and then attempts synchronization, e.g., by correlating a known sequence to the received signal. Because the timing position of the device 30 within the frequency hopping pattern is unknown, the wireless communication device 30 stays on the chosen frequency for as long as it takes for the network node 20 to cycle through all frequencies of the frequency hopping pattern where signals for synchronization are transmitted.

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The solution presented herein enables the wireless communication device to select the synchronization procedure that uses less power and prolongs battery life (e.g., the synchronization procedure that assumes a known timing position) whenever possible, and thus limits the use of the synchronization procedure that assumes an unknown timing position. In so doing, the solution presented herein reduces power consumption, prolongs battery life, and reduces operational costs.

The solution presented herein may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein.

The invention claimed is:

1. A method of synchronizing a timing of a wireless communication device with a network node, the wireless communication device configured to operate according to a frequency hopping pattern defined by the network node, the frequency hopping pattern comprising a dwell time representing a time interval between frequency hops, and the wireless communication device configured to receive downlink signals from the network node and to transmit uplink signals to the network node, the method performed by the wireless communication device and comprising:
    determining a maximum timing deviation responsive to a sleep time after the wireless communication device wakes up from a sleep mode, the sleep time representing a duration of the sleep mode;
    computing an estimated time overlap from a difference between the dwell time and the maximum timing deviation;
    selecting a first synchronization procedure when the estimated time overlap exceeds a threshold, wherein the first synchronization procedure assumes a known timing position of the wireless communication device within the frequency hopping pattern;
    selecting a second synchronization procedure when the estimated time overlap is less than or equal to the threshold, wherein the second synchronization procedure assumes an unknown timing position of the wireless communication device within the frequency hopping pattern; and
    synchronizing the timing of the wireless communication device using the selected synchronization procedure.

2. The method of claim 1, further comprising determining the dwell time.

3. The method of claim 1, wherein the determining the maximum timing deviation comprises multiplying a clock drift rate by the sleep time, wherein the clock drift rate corresponds to a clock circuit of the wireless communication device.

4. The method of claim 1, wherein the determining the maximum timing deviation comprises:
    identifying a predetermined sleep time in a look-up table closest to the sleep time, the look-up table relating each of one or more predetermined timing deviations to a corresponding predetermined sleep time;
    retrieving the predetermined timing deviation corresponding to the identified predetermined sleep time from the look-up table; and
    setting the maximum timing deviation to the retrieved predetermined timing deviation.

5. The method of claim 1:
    further comprising calculating a past timing deviation associated with a past sleep time;
    wherein the determining the maximum timing deviation comprises determining the maximum timing deviation using the calculated past timing deviation, the past sleep time, and the sleep time.

6. The method of claim 1, further comprising:
    starting a timer upon beginning the first synchronization procedure; and
    changing the selected synchronization procedure from the first synchronization procedure to the second synchronization procedure upon expiration of the timer.

7. The method of claim 1, further comprising:
    initializing a counter after beginning the first synchronization procedure;
    incrementing the counter after each unsuccessful attempt to synchronize the timing using the first synchronization procedure; and
    changing the selected synchronization procedure from the first synchronization procedure to the second synchronization procedure when the counter reaches a predetermined number.

8. The method of claim 1, further comprising determining the frequency hopping pattern responsive to identification information received from the network node.

9. The method of claim 1, wherein the first synchronization procedure comprises following the frequency hopping pattern with the assumed known timing position of the wireless communication device being the same as it was before the wireless communication device entered the sleep mode.

10. The method of claim 1:
    further comprising determining an estimated timing responsive to the sleep time;
    wherein the first synchronization procedure comprises following the frequency hopping pattern with the assumed known timing position of the wireless communication device being the estimated timing.

11. The method of claim 1, wherein the second synchronization procedure comprises selecting one frequency known to be part of the frequency hopping pattern and staying on the selected frequency until synchronization is achieved.

12. A wireless communication device configured to receive downlink signals from a network node and to transmit uplink signals to the network node, the wireless communication device configured to operate according to a frequency hopping pattern defined by the network node, the frequency hopping pattern comprising a dwell time representing a time interval between frequency hops, the wireless communication device comprising:
a timing circuit configured to:
determine a maximum timing deviation responsive to a sleep time after the wireless communication device wakes up from a sleep mode, the sleep time representing a duration of the sleep mode;
compute an estimated time overlap from a difference between the dwell time and the maximum timing deviation;
a selection circuit configured to:
select a first synchronization procedure when the estimated time overlap exceeds a threshold, wherein the first synchronization procedure assumes a known timing position of the wireless communication device within the frequency hopping pattern;
select a second synchronization procedure when the estimated time overlap is less than or equal to the threshold, wherein the second synchronization procedure assumes an unknown timing position of the wireless communication device within the frequency hopping pattern; and
a synchronization circuit configured to synchronize a timing of the wireless communication device using the selected synchronization procedure.

13. The wireless communication device of claim 12, wherein the wireless communication device is further configured to determine the dwell time.

14. The wireless communication device of claim 12:
further comprising a clock circuit associated with a clock drift rate; and
wherein the timing circuit is configured to determine the maximum timing deviation by multiplying the clock drift rate by the sleep time.

15. The wireless communication device of claim 12:
further comprising a memory circuit configured to store a look-up table relating each of one or more predetermined timing deviations to a corresponding predetermined sleep time; and
wherein the timing circuit is configured to determine the maximum timing deviation by:
identifying the predetermined sleep time in the look-up table closest to the sleep time;
retrieving the predetermined timing deviation corresponding to the identified predetermined sleep time from the look-up table; and
setting the maximum timing deviation to the retrieved predetermined timing deviation.

16. The wireless communication device of claim 12:
wherein the wireless communication device is further configured to receive a past timing deviation associated with a past sleep time; and
wherein the timing circuit is configured to determine the maximum timing deviation by determining the maximum timing deviation using the received past timing deviation, the past sleep time, and the sleep time.

17. The wireless communication device of claim 12:
further comprising a timer circuit configured to start upon the synchronization circuit beginning the first synchronization procedure; and
wherein the selection circuit is further configured to change the selected synchronization procedure from the first synchronization procedure to the second synchronization procedure upon expiration of the timer circuit.

18. The wireless communication device of claim 12:
further comprising a counter circuit initialized upon the synchronization circuit beginning the first synchronization procedure;
wherein the selection circuit is further configured to:
increment the counter circuit after each unsuccessful attempt to synchronize the timing using the first synchronization procedure; and
change the selected synchronization procedure from the first synchronization procedure to the second synchronization procedure when the counter circuit reaches a predetermined number.

19. The wireless communication device of claim 12, wherein the wireless communication device is further configured to determine the frequency hopping pattern responsive to identification information received from the network node.

20. The wireless communication device of claim 12, wherein the first synchronization procedure follows the frequency hopping pattern with the assumed known timing position of the wireless communication device being the same as it was before the wireless communication device entered the sleep mode.

21. The wireless communication device of claim 12:
wherein the timing circuit is further configured to determine an estimated timing responsive to the sleep time; and
wherein the first synchronization procedure follows the frequency hopping pattern with the assumed known timing position of the wireless communication device being the estimated timing.

22. The wireless communication device of claim 12:
wherein the selection circuit is further configured to select one frequency known to be part of the frequency hopping pattern; and
wherein the second synchronization procedure stays on the selected frequency until synchronization is achieved.

23. A non-transitory computer readable recording medium storing a computer program product for synchronizing a timing of a wireless communication device with a network node, the wireless communication device configured to operate according to a frequency hopping pattern defined by the network node, the frequency hopping pattern comprising a dwell time representing a time interval between frequency hops, and the wireless communication device configured to receive downlink signals from the network node and to transmit uplink signals to the network node, the computer program product comprising software instructions which, when run on processing circuitry of the wireless communication device, causes the wireless communication device to:
determine a maximum timing deviation responsive to a sleep time after the wireless communication device wakes up from a sleep mode, the sleep time representing a duration of the sleep mode;
compute an estimated time overlap from a difference between the dwell time and the maximum timing deviation;

select a first synchronization procedure when the estimated time overlap exceeds a threshold, wherein the first synchronization procedure assumes a known timing position of the wireless communication device within the frequency hopping pattern;

select a second synchronization procedure when the estimated time overlap is less than or equal to the threshold, wherein the second synchronization procedure assumes an unknown timing position of the wireless communication device within the frequency hopping pattern; and synchronize the timing of the wireless communication device using the selected synchronization procedure.

\* \* \* \* \*